Figure 1:
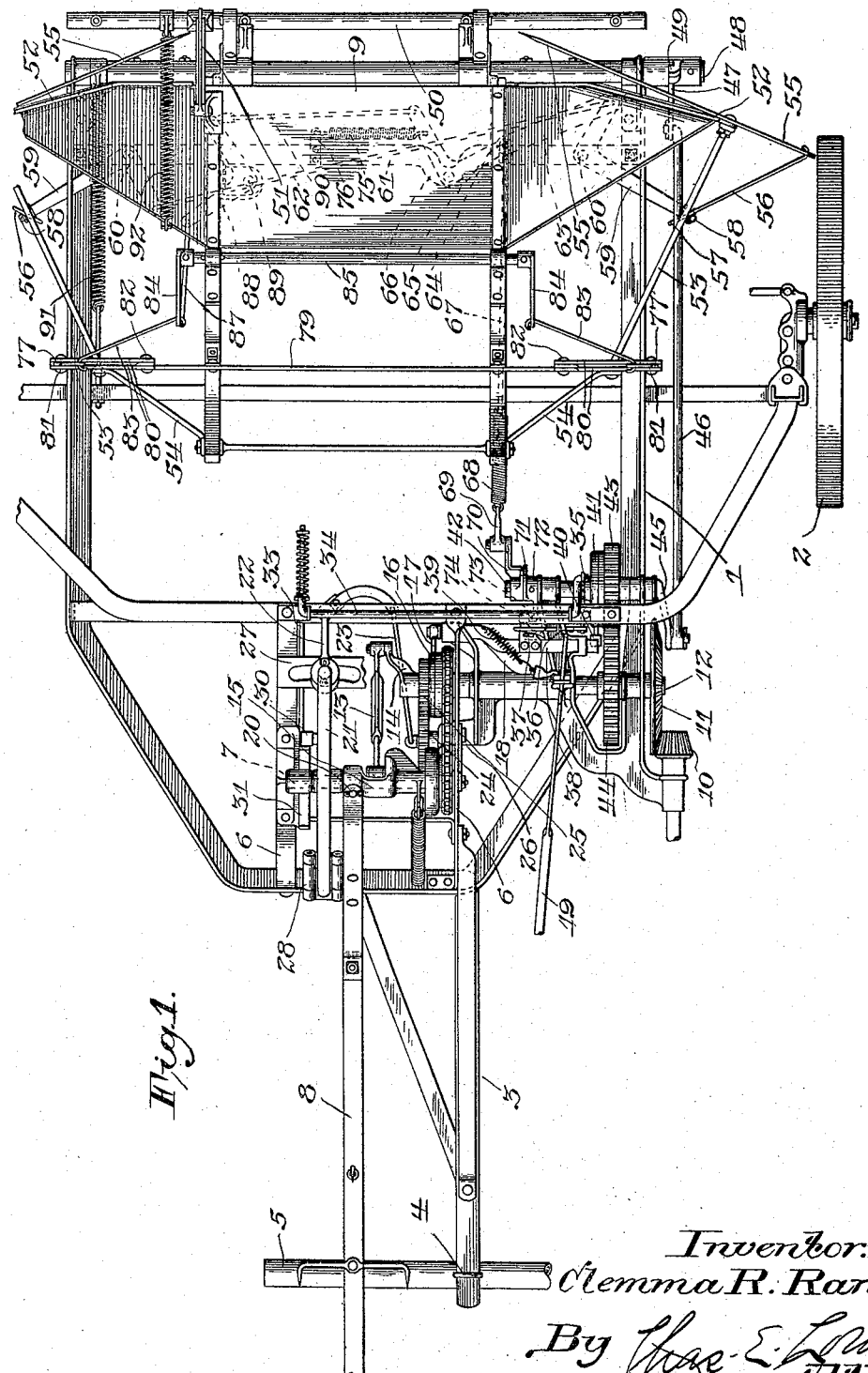

C. R. RANEY.
GRAIN SHOCKING MACHINE.
APPLICATION FILED FEB. 7, 1916.

1,202,007.

Patented Oct. 17, 1916.
3 SHEETS—SHEET 1.

Inventor.
Clemma R. Raney,
By Chas. E. Lord
Atty.

C. R. RANEY.
GRAIN SHOCKING MACHINE.
APPLICATION FILED FEB. 7, 1916.
1,202,007.
Patented Oct. 17, 1916.
3 SHEETS—SHEET 2.
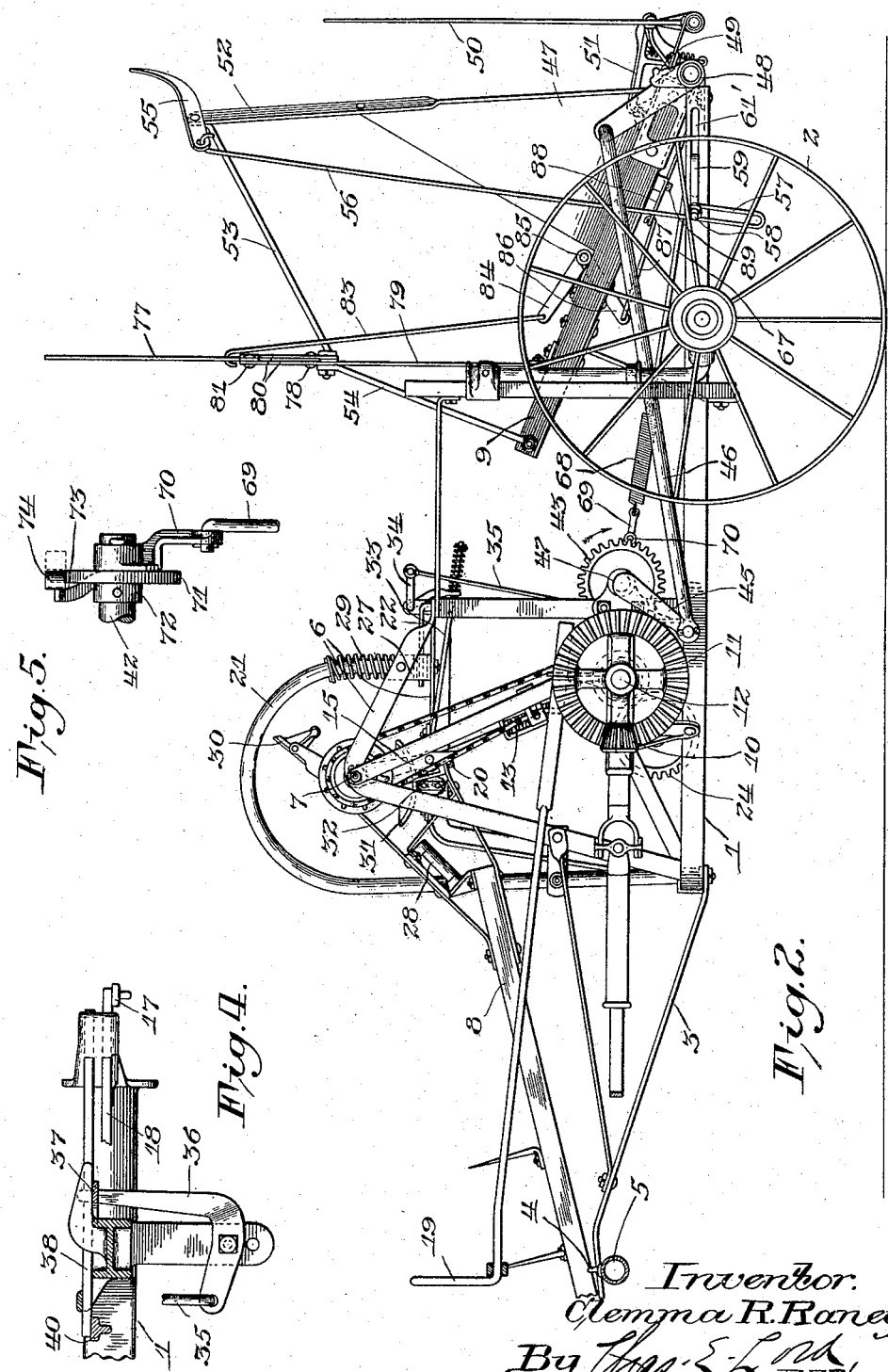

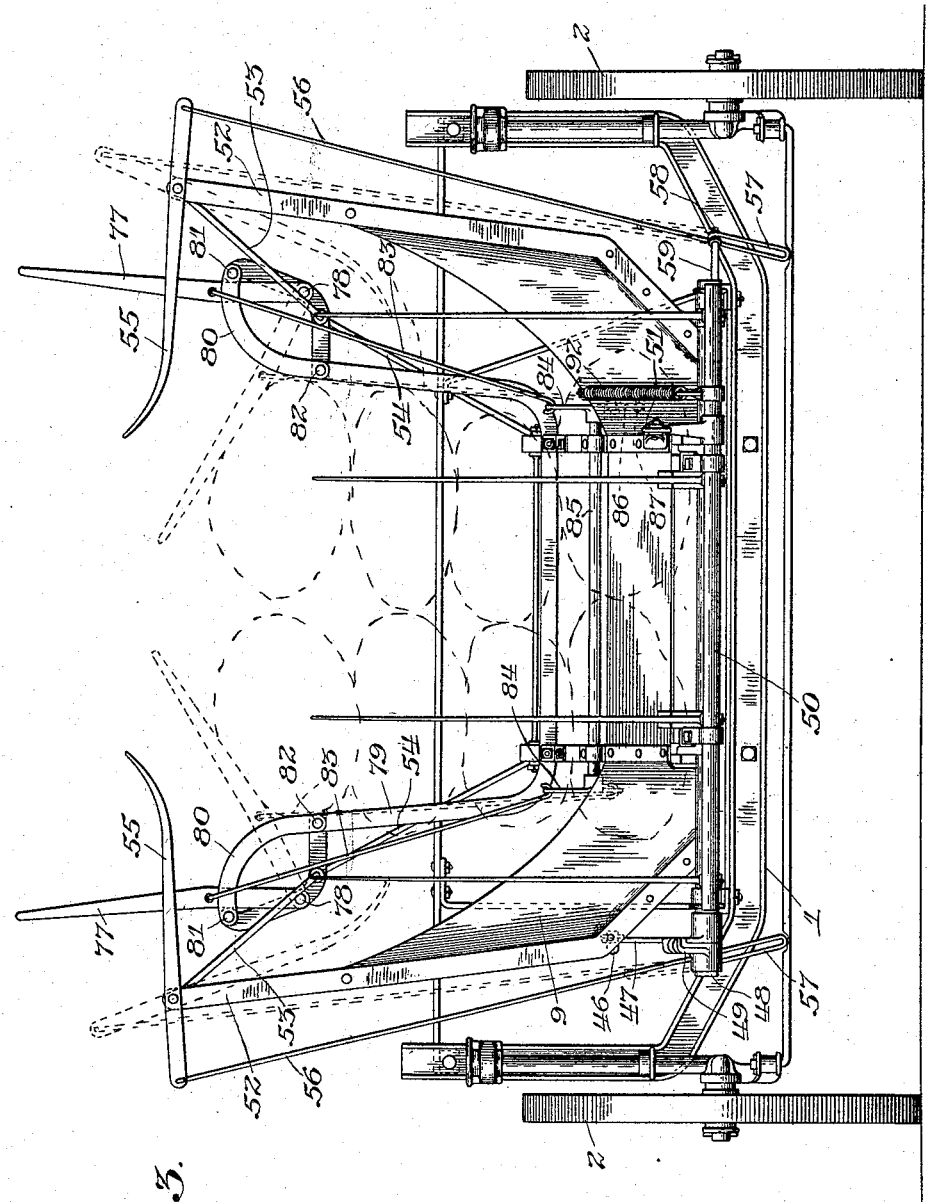

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

GRAIN-SHOCKING MACHINE.

1,202,007.   Specification of Letters Patent.   Patented Oct. 17, 1916.

Application filed February 7, 1916. Serial No. 76,725.

*To all whom it may concern:*

Be it known that I, CLEMMA R. RANEY, a citizen of the United States, residing at Chicago, in the county of Cook and State of Illinois, have invented certain new and useful Improvements in Grain-Shocking Machines, of which the following is a full, clear, and exact specification.

My invention relates to grain shocking machines.

It has for its object to produce an improved and simplified machine which will build and set stable shocks in the field without the necessity for binding the shocks prior to setting the same.

Further objects of my invention are to provide improved mechanism for spreading the butt of a shock as it is set, improved mechanism for compressing the head of the shock, and improved controlling means for the butt spreading mechanism and other mechanisms of the machine.

I attain these objects by an improved construction of shocker, hereinafter described, wherein the shock binding mechanism is omitted, and, through the control of the butt spreading mechanism by the size of the shock head, the size of the shock butt relative to the head is so controlled and regulated as under all conditions to insure the product of a shock adapted to stand in the field, the several mechanisms of the machine being improved and simplified as hereinafter set forth.

In the accompanying drawings I have, for purposes of illustration, shown one embodiment which my invention may assume in practice.

In these drawings: Figure 1 is a plan view of a shocker embodying my improved construction. Fig. 2 is a side elevation of the construction shown in Fig. 1. Fig. 3 is a rear elevation of the same construction with the receptacle filled with sheaves, the sheaf delivery mechanism being omitted and the head compressing and butt spreading members being shown in a plurality of positions. Fig. 4 is a detail view of the clutch controlling bell crank mechanism controlling the dumping and sheaf delivery mechanism. Fig. 5 is a detail view of the rotatable cam controlling the clutch mechanism for the sheaf delivery member.

The shocker shown is of the general type described and claimed in my copending application, Serial No. 743,740, filed January 23, 1913, and more specifically of the construction of a later application, Serial No. 40,660, filed July 10, 1915. As shown, it includes a frame 1 mounted upon transport wheels 2 and having a tongue 3 slidably connected through a staple 4 with a support 5, which is carried upon the binder, not shown, the shocker trailing in rear and at the stubbleward side of the binder. Upon the supplemental frame 6 on the front of this frame 1 is mounted a transverse shaft 7 carrying a longitudinally disposed swinging sheaf delivery member 8 normally disposed prostrate beneath the deck of a binder and driven upward and rearward from that position to deliver sheaves prostrate in an upwardly and rearwardly movable shock receptacle 9 located at the rear of the frame, through power connections, including a suitably driven bevel gear 10, a meshing bevel gear 11 carried upon a cross shaft 12, and a resilient pitman connection 13 between a crank 14 on the stubbleward end of the shaft 12 and a member 15 on the shaft 7 engageable with the sheaf delivery member to oscillate the same back and forth about its pivot. As in the construction described in my last mentioned application, the connection of the crank 14 to the shaft 12 is controlled by a clutch 16 carried on the stubbleward end of the shaft 12 and provided with a rotatable clutch member 17 intermittently engageable with a reciprocating clutch controlling member 18, which is in turn controlled by a rocking trip member 19 projecting above the deck of a harvester and depressible by a sheaf moving thereover to release the clutch and cause the sheaf delivery member to be moved upward and rearward to deliver the sheaf. As in the construction described in the last mentioned application, this sheaf delivery member is also pivoted on a vertical pivot 20 and deflected laterally as it moves upward and rearward to deliver a sheaf, by an upstanding longitudinally disposed laterally swinging U-shaped bail 21 which has its rear arm connected through a suitable crank and link connection 22, 23 with a plurality of two to one gears 24, 25 journaled on a lower supplemental frame member 26 and the shaft 12, respectively, the parts operating in such a manner that as the shaft 12 is rotated, the arm of the bail 20 which is connected to the crank 22 is oscillated from side to side in a slotted member 27 carried upon the frame 6, and the delivery member 8, through a guide 28, is likewise deflected as it moves backward to deliver sheaves alternately upon opposite sides of the receptacle 9, a spring 29 coiled about the rear arm of the bail 20 acting to cushion the delivery member and impart a quick, backward, sheaf disengaging movement thereto. As in the construction described in the last mentioned application, this sheaf delivery member 8 is also adapted to control the dumping of the shock, actuating the dumping mechanism to tilt the receptacle 9 when the shock butt has reached a predetermined size or height in the latter, a controlling member 30 moving with the sheaf delivery member 8 and normally engageable with one surface of an inverted arcuate cam 31 disposed beneath the shaft 7, being engageable with a trip 32 when the shock has reached a predetermined size, to thereby actuate a rearwardly extending spring-pressed link 33 connected to a clutch controlling crank 34 which is journaled on the frame 6 and extends transversely across the same in front of the receptacle and has its stubbleward end connected through a link 35 and bell crank 36 with a laterally extending bracket 37 on a reciprocating clutch controlling member 38 connected to the clutch controlling member 18 by a spring 39 and reciprocable into engagement with the dog 17 of the clutch 16 and the rotating dog 40 of a clutch 41 controlling the dumping mechanism.

In my improved construction, wherein no binding mechanism is used, the clutch 41 is carried on the grainward end of a short shaft 42 parallel to the shaft 12 and disposed in rear thereof. This clutch 41 controls the connection to the shaft 42 of a gear 43 meshing with a second gear 44 disposed in front of the same and fixed to the shaft 12. Rotatably mounted on the grainward end of the shaft 42 is a crank 45 connected to a longitudinally disposed rod 46, which is in turn connected to a shorter angularly disposed link 47 (Fig. 2) journaled on a rear transverse shaft 48 and intermittently engageable with an upstanding member 49, fixed to that shaft, to tilt the shaft and thereby tilt the receptacle 9 from the normal position shown in Fig. 2 to a substantially upright position to discharge the shock, this latter mechanism being likewise of the construction described in my last mentioned copending application. As in the construction described therein, an upstanding end tine member 50 is also carried at the rear of the receptacle and normally held in upstanding position by a latch mechanism 51 automatically releasable as the receptacle is tilted.

Carried at the rear end of the receptacle 9 and on opposite sides of the same and above the bottom thereof on standards 52, braced at 53, 54 at the front of the cradle, are transversely disposed butt spreading tines 55 of the construction described and claimed in my copending application, Serial No. 743,562, filed January 22, 1913, these tines being pivoted at points intermediate their ends and having their inner ends converging and depressible by the sheaves in the shock butt in the receptacle. As described in that application, the outer ends of these tines 55 are also connected through downwardly extending links 56 having slotted lower ends 57 with members 58 extending laterally from the frame so that, as the receptacle is moved to tilting position, the tines 55 are swung upward from the position in which the sheaves delivered to the receptacle depress them, in such a manner as to spread the upper sheaves of the shock butt. In my improved construction, however, these butt spreading members 55 are controlled in an improved manner, the members 58 being attached to the outer and longer arms of bell cranks 59 pivoted at 60 to a transverse bar 61 carried on the rear of the frame 1 and beneath the rear end of the receptacle 9, these arms of the bell cranks 59 being movable back and forth in longitudinally disposed slots 61' in the sides of the frame 1. As shown, the short arms of these bell cranks are pivotally connected by a slightly diagonally disposed transverse link 62, and the short arm of the grainward bell crank 59 is connected with the grainward end of a link 63 pivoted at 64 to the grainward end of a bell crank 65 pivoted on a forwardly extending bowed portion 66 to the transverse bar 61 and also pivoted to a longitudinally disposed link 67 disposed beneath the receptacle and connected through a coiled spring 68 and link 69 with a crank 70 journaled on the stubbleward end of the shaft 42 and intermittently driven thereby, through a driving arm 71, until it passes over its center in a manner similar to the action of the member 49, the member 71 being carried by a member 72 fixed to the shaft 42 and having a laterally extending cam surface 73 engageable with a roller 74 on the bracket 37 carried on the reciprocable clutch controlling member 38, this clutch controlling member being thus held in to prevent the delivery of a sheaf by the delivery member 8 during the dumping operation, irrespective of the actuation of the clutch controlling member 18. Pivotally connected to the stubbleward arm of the bell crank 65 and acting to hold the parts just described normally in the position shown in Fig. 1, is a coiled spring 75 disposed parallel to the bar 61 and connected to a rearwardly disposed extension 76 thereon.

Operatively connected to the butt spreading tines just described, is the means for controlling the amount of spread thereof and regulating the same in accordance with the variations in the size of the head of the shock formed in the receptacle 9, these means also having the function of compressing the head of the shock and holding it compressed until the shock is set. As shown, these means include normally upright head engaging members 77 pivoted at 78 on a standard 79 braced on the receptacle 9 by the braces 53, 54 and movable transversely across the receptacle and downwardly about their pivots from the normally upright position shown in full lines in Fig. 3 to the dotted line position shown in that figure, the same being guided in their movement by parallel curved guide members 80 and limited by stops 81 and 82 in their upward and downward movement, though the top of a shock in the receptacle 9 acts to limit their downward movement when the receptacle is filled. Pivotally connected to these members 77 at points inside of their pivots 78 are downwardly extending links 83 pivoted at their lower ends to longitudinally extending cranks 84 fixed to the opposite ends of a transverse shaft 85 journaled on the upper surface of the bottom of the receptacle 9. As shown, the stubbleward end of this shaft 85 is also provided with a second crank 86 disposed at an angle to and downwardly from the other crank 84, and this crank 86 is connected through a rearwardly extending link 87 with a horizontally disposed bell crank 88 pivoted at 89 on the under surface of the bottom of the receptacle 9 and having a rearwardly extending arm pivotally connected to a transverse link 90 with the rearwardly extending arm of the bell crank 65, which is connected to the spring 75, the link 90 being preferably connected to the free end of the arm while the spring is preferably connected thereto at a point nearer the bell crank pivot.

In the operation of my improved construction, the sheaf delivery member 8 is tripped into operation by the member 19 and moved upward and rearward to deliver sheaves in the receptacle in the manner described in my applications previously mentioned. As it moves to deliver each sheaf, it is also deflected laterally in such a manner as to build up a prostrate shock in the receptacle 9, with the heads of the sheaves on opposite sides of the receptacle overlapping and the butts diverging. When the butts of the sheaves in the receptacle 9 have reached a predetermined height, the member 30, movable with the fork, engages the trip 32 in such a manner as to reciprocate the clutch controlling member 38 into engagement with the clutch controlling member 17 of the delivery member clutch and thereby render the sheaf delivery member inoperative, at the same time that this member is withdrawn from engagement with the rotating dog 40 of the clutch 41, thereby connecting the gear 43 and shaft 42 to the shaft 12. As the shaft 42 is rotated, the crank and link connection 46, 47 is operated and the receptacle 9 tilted upward and rearward about its pivot. As the same moves rearward, the butt spreading members 55, which, of course, have been depressed into the dotted line position shown in Fig. 3 by the sheaves delivered to the receptacle, are swung upward and rearward about their pivots, at the same time that the head engaging members 77 are swung from the full line position shown in Fig. 3 to the dotted line position therein, wherein they engage and compress the head of the shock. Obviously, through the connected mechanism between the members 77 and the members 55, the amount of outward movement of the latter members will be controlled and regulated by the amount of downward movement of the members 77, so that the amount of spreading action of the members 55 will be controlled by the size of the head of the shock and a shock will always be produced which has a butt sufficiently larger than the head to insure its standing in the field. Obviously, during the upward and rearward movement of the receptacle, the members 77 will remain in contact with the heads of the sheaves as the members 55 are swung upward and backward to spread the butt of the shock. When, however, the receptacle has reached its substantially vertical or discharging position, the members 77 will obviously be disengaged therefrom, through their operative connections shown, and thrown backward to their normal position illustrated in full lines in Fig. 3, wherein they permit the shock to be discharged freely from the receptacle. Obviously, the receptacle 9 and end tine member 51 will be returned to their normal position shown in Fig. 2 by suitable springs 91 and 92, respectively, and the butt spreading members 55 will likewise be returned to their normal position shown in full lines in Fig. 3, due to the weight of the link connections 56. It will also be noted that while the shock is being set and the receptacle 9 is moving either to shock discharging position, and returning therefrom, the sheaf delivery member 8 is held out of operation by the clutch controlling member 38 through the action of the cam 73 on the member 71 rotating with the shaft 42.

While I have in this application specifically described one embodiment which my invention may assume in practice, it is to be understood that the form thereof illustrated herein is used for purposes of description and that the invention is not limited thereto.

What I claim as my invention and desire to secure by Letters Patent is:

1. In a shocking machine, a frame, a shock setting receptacle thereon, and means for producing a certain constant proportion between the sizes of the heads and butts of shocks set thereby.

2. In a shocking machine, a frame, a shock setting receptacle thereon, and means for spreading the butt of a shock set thereby into a predetermined proportion to the head of the shock under all grain conditions.

3. In a shocking machine, a frame, a shock receptacle thereon, mechanism for spreading the butt of a shock in said receptacle, and means controlled by the size of the head of the shock controlling said mechanism.

4. In a shocking machine, a frame, a shock receptacle thereon, mechanism for spreading the butt of a shock in said receptacle, and means controlled by the size of the head of the shock controlling the amount of movement of said mechanism.

5. In a shocking machine, a frame, a tilting shock receptacle reclining thereon, mechanism for spreading the butt of a shock in said receptacle, and means controlled by the size of the head of the shock controlling said mechanism.

6. In a shocking machine, a frame, a tilting shock receptacle reclining thereon, mechanism for spreading the butt of a shock in said receptacle, and means controlled by the size of the head of the shock controlling the amount of movement of said mechanism.

7. In a shocking machine, a shock receptacle, means for spreading the butt of a shock therein controlled by the size of the head of the shock, and means for setting said mechanism in operation when the shock has reached a predetermined size.

8. In a shocking machine, a frame, a shock receptacle thereon, adjustable mechanism for spreading the butt of a shock in said receptacle, and means for adjusting said butt spreading mechanism controlled by the size of the head of the shock.

9. In a shocking machine, a frame, a shock receptacle thereon, means engageable with the head of a shock therein, and means for spreading the butt of the shock therein controlled by said last mentioned means.

10. In a shocking machine, a frame, a shock receptacle thereon, adjustable means for spreading the butt of a shock therein, and means for increasing the amount of spread of the butt when the size of the shock head increases.

11. In a shocking machine, a frame, a shock receptacle thereon, adjustable means for spreading the butt of a shock therein, and means for decreasing the amount of spread of the butt when the size of the shock head decreases.

12. In a shocking machine, a frame, a shock receptacle thereon, adjustable means for spreading the butt of a shock therein, and means for increasing or decreasing the amount of spread of the butt as the size of the shock head increases or decreases.

13. In a shocking machine, a frame, a shock setting receptacle thereon, and means controlled by the size of the shocks therein for spreading the butts of the shocks set thereby into a predetermined larger size than the heads of said shocks under all grain conditions.

14. In a shocking machine, a shock receptacle, dumping mechanism therefor, mechanism for spreading the butt of a shock controlled by the size of the head of the shock, and mechanism for setting said dumping and butt spreading mechanism in operation when the shock has reached a predetermined size.

15. In a shocking machine, a frame, a shock setting receptacle thereon, and means controlled by the height of the butt of a shock therein for spreading the butts of the shocks set thereby into a predetemined larger size than the heads of said shocks under all grain conditions.

16. In a shocking machine, a frame, a shock setting receptacle thereon, automatic mechanism for setting the shock in said receptacle, and means for spreading the butt of a shock as it is set thereby into a predetermined proportion to the head of the shock under all grain conditions.

17. In a shocking machine, a frame, a tilting shock receptacle reclining thereon, means for tilting said receptacle to shock discharging position, and means set in operation thereby for spreading the butt of a shock in said receptacle into a predetermined proportion to the head of the shock under all grain conditions.

18. In a shocking machine, a frame, a tilting shock receptacle thereon, means for tilting said receptacle to shock discharging position, and means for compressing the head of a shock in said receptacle and spreading the butt thereof into a predetermined proportion to the head of the shock under all grain conditions.

19. In a shocking machine, a frame, a shock setting receptacle thereon, automatic mechanism for setting the shock in said receptacle controlled by the size of the shock, and means for spreading the butt of a shock as it is set thereby into a predetermined proportion to the head of the shock under all grain conditions.

20. In a shocking machine, a frame, a shock receptacle thereon, mechanism for spreading the butt of a shock in said receptacle, mechanism for compressing the head of a shock in said receptacle, and means controlled by said last mentioned mechanism controlling the operation of said first mentioned mechanism.

21. In a shocking machine, a frame, an oscillating sheaf delivery member pivoted thereon, a prostrate shock receptacle pivoted thereon and receiving sheaves from said delivery member, means for tilting said receptacle when a shock built therein has reached a predetermined size, and mechanism for spreading the butt of a shock as it is tilted controlled by the size of the head of the shock.

22. In a shocking machine, a frame, a shock receptacle thereon, a member pivoted on said receptacle engageable with the top of the sheaf heads therein, a plurality of members pivoted on said receptacle and movable about their pivots to spread the butt of a shock in said receptacle, and operative connections between said members whereby the range of movement of said head engaging member determines the range of movement of said butt spreading members.

23. In a shocking machine, a frame, a rearwardly dumping shock receptacle normally prostrate thereon, butt spreading members pivoted above the rear end of said receptacle, depending members pivotally connected to said spreading members, laterally extending movable members slidably connected to said depending members, and means for varying the amount of movement of said laterally extending members.

24. In a shocking machine, a frame, a rearwardly dumping shock receptacle normally prostrate thereon, butt spreading members pivoted above the rear end of said receptacle, depending members pivotally connected to said spreading members, laterally extending members movable in a horizontal plane and slidably connected to said depending members, and means for moving said laterally extending members as said receptacle is tilted.

25. In a shocking machine, a frame, a rearwardly dumping shock receptacle normally prostrate thereon, butt spreading members pivoted above the rear end of said receptacle, depending members pivotally connected to said butt spreading members, laterally extending members movable in a horizontal plane and slidably connected to said depending members, means for moving said laterally extending members as said receptacle is tilted, and means for varying the amount of movement of said members in accordance with variations in the size of the head of the shock.

26. In a shocking machine, a frame, a rearwardly dumping shock receptacle normally prostrate thereon, butt spreading members pivoted above the rear end of said receptacle, depending members pivotally connected to said spreading members, laterally extending members movable in a horizontal plane and slidably connected to said depending members, means for moving said laterally extending members as said receptacle is tilted, means engageable with the head of the shock, and means connected to said last mentioned means controlling the amount of movement of said laterally extending members.

27. In a shocking machine, a frame, a tilting shock receptacle normally reclining thereon, butt spreading mechanism on said receptacle, head compressing members on said receptacle engageable with the head of a shock therein and operatively connected to said butt spreading mechanism, and means for moving said head compressing members into engagement with the shock and operating said butt spreading mechanism as the receptacle is tilted and releasing said compressing members from the shock when the latter is in vertical position.

28. In a shocking machine, a frame, a tilting shock receptacle normally reclining thereon, shock head compressing members pivoted at the front end of said receptacle engageable with the head of a shock therein, mechanism for depressing the same into engagement with the shock as the receptacle is tilted, and mechanism for moving said head compressing members in an opposite direction when the shock is in vertical position.

29. In a shocking machine, a frame, a tilting shock receptacle normally reclining thereon, members pivoted at the front end of said receptacle and engageable with the head of a shock therein, means for tilting said receptacle when the shock has reached a predetermined size, and means for swinging said members into engagement with the head of the shock when the shock has reached a predetermined size and laterally out of the path of the head of the shock when the latter is set.

30. In a shocking machine, a shock receptacle, a plurality of transversely movable members pivoted on opposite sides thereof engageable with the head of a shock therein, a plurality of pivoted transversely extending butt spreading members disposed in rear of said first mentioned members, a crank shaft journaled on said receptacle, operative connections between the same and said head engaging members, and operative connections between said shaft and said butt spreading members.

31. In a shocking machine, a frame, a swinging sheaf delivery member pivoted thereon, operating mechanism for said delivery member including a shaft, a shock receptacle pivoted on said frame receiving sheaves from said delivery member, a supplemental shaft carried on said frame, operative connections between said shafts, a crank on said supplemental shaft, a link connected to said crank and disposed longitudinally of said frame, and dumping mechanism connected between the rear end of said link and said receptacle.

32. In a shocking machine, a frame, an oscillating sheaf delivery member pivotally mounted thereon, operating mechanism therefor including a transverse shaft, a supplemental shaft disposed parallel thereto, driving mechanism between said shafts, a crank on said supplemental shaft, dumping mechanism for said receptacle connected to said crank, a clutch controlling the connection of said delivery member to said first mentioned shaft, a clutch controlling the connection of said driving mechanism to said supplemental shaft, and clutch controlling mechanism controlling the connection of said clutches.

33. In a shocking machine, a frame, an oscillating sheaf delivery member pivotally mounted thereon, operating mechanism therefor including a transverse shaft, a supplemental shaft disposed parallel thereto, driving mechanism between said shafts, a crank on said supplemental shaft, dumping mechanism for said receptacle connected to said crank, a clutch controlling the connection of said fork to said first mentioned shaft, a clutch controlling the connection of said driving mechanism to said supplemental shaft, a clutch controlling member controlling the connection of said clutches, and means rotatable with said supplemental shaft controlling the movement of said clutch controlling member.

34. In a shocking machine, a frame, a tilting shock receptacle normally reclining thereon, pivoted butt spreading members disposed above said receptacle, depending means pivotally connected thereto, horizontally disposed bell cranks pivoted on said frame beneath said receptacle, each having one arm slidably connected with said depending members, operative connections between the remaining arms of said bell cranks, and means controlled by the size of the head of the shock in said receptacle controlling the movement of said bell cranks.

35. In a shocking machine, a frame, a sheaf delivery member pivoted thereon, sheaf delivery mechanism including a transverse shaft, a clutch carried on said shaft, a supplemental transverse shaft, driving connections between said shafts, a clutch controlling said driving connection, a clutch controlling member engageable with either of said clutches, and means rotatable with said second shaft for holding said clutch controlling member in engagement with the sheaf delivery clutch when said second clutch is connected.

36. In a shocking machine, a frame, a sheaf delivery member pivoted thereon, sheaf delivery mechanism including a transverse shaft, a clutch carried on said shaft, a supplemental transverse shaft, driving connections between said shafts, a clutch controlling said driving connections, a clutch controlling member engageable with either of said clutches, means rotatable with said second shaft for holding said clutch controlling member in engagement with the sheaf delivery clutch when said second clutch is connected, and a supplemental clutch controlling member controlled by the delivery of sheaves to said sheaf delivery member.

37. In a shocking machine, a frame, a sheaf delivery member pivoted thereon, sheaf delivery mechanism including a transverse shaft, a clutch carried on said shaft, a supplemental transverse shaft, driving connections between said shafts, a clutch controlling said driving connection, a clutch controlling member engageable with either of said clutches, and a cam rotatable with said second shaft and engageable with said clutch controlling member during a predetermined part of the rotation of said second shaft.

38. In a shocking machine, a frame, sheaf delivery mechanism thereon, a transverse power shaft on said frame, a clutch controlling the connection of said delivery mechanism to said power shaft, a second transverse shaft on said frame, a driving connection between said shafts, a clutch controlling the connection of said driving connection to said second shaft, a tilting shock receptacle normally reclining on said frame, a crank on said second shaft, a longitudinally disposed member connected to said crank, dumping mechanism connected to the rear end of said longitudinally disposed member, a clutch controlling member, and means for throwing said clutch controlling member out of engagement with the clutch controlling said driving connection and into engagement with the clutch controlling said sheaf delivery mechanism.

39. In a shocking machine, a frame, sheaf delivery mechanism thereon, a transverse power shaft on said frame, a clutch controlling the connection of said delivery mechanism to said power shaft, a second transverse shaft on said frame, a driving connection between said shafts, a clutch controlling the connection of said driving connection to said second shaft, a tilting shock receptacle normally reclining on said frame, a crank on said second shaft, a longitudinally disposed member connected to said crank, dumping mechanism connected to the rear end of said longitudinally disposed member, a clutch controlling member, means for throwing said clutch controlling member out of engagement with the clutch controlling said driving connection and into engagement with the clutch controlling said sheaf delivery mechanism, and means for retaining the clutch for said sheaf delivery mechanism out of operation during the tilting of said receptacle.

In testimony whereof I affix my signature.

CLEMMA R. RANEY.

Copies of this patent may be obtained for five cents each, by addressing the "Commissioner of Patents, Washington, D. C."